Aug. 9, 1955  A. S. BISHOP  2,715,182
VARIABLE RATE SWEEP VOLTAGE GENERATOR
Filed April 3, 1945
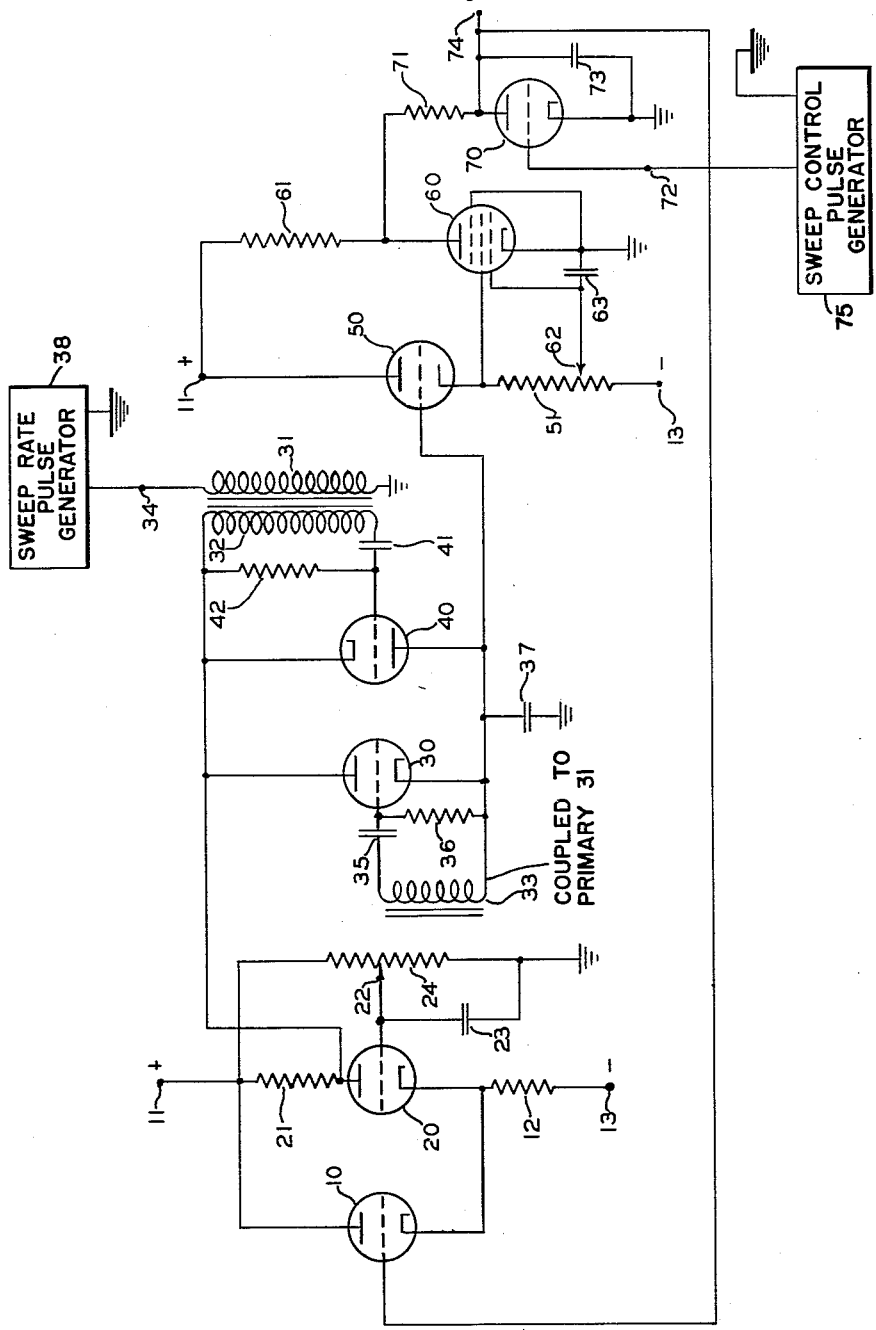
INVENTOR.
AMASA S. BISHOP
BY
*William D. Hall*
ATTORNEY

United States Patent Office 2,715,182
Patented Aug. 9, 1955

2,715,182

VARIABLE RATE SWEEP VOLTAGE GENERATOR

Amasa S. Bishop, Cambridge, Mass., assignor, by mesne assignments, to the United States of America as represented by the Secretary of War Application April 3, 1945, Serial No. 586,418

4 Claims. (Cl. 250—27)

My invention relates in general to electrical circuits and more specifically to an electrical modifying circuit wherein a voltage wave with a time rate of rise inversely proportional to a given time interval is produced.

In the development of radiant energy systems for the determination of geometric locations of remote objects, it has become general practice to use indicating apparatus embodying the use of cathode ray tubes. Such an indicating means requires the use of some type of sweep circuit which deflects the electron beam within the cathode ray tube in such a manner as to provide a time base upon which the indication of remote objects may be presented, and thus data may be obtained as to the distance to the remote objects and also the azimuth in certain types of indicating means. Certain types of indication use a system of intensity modulation wherein the electron beam within the cathode ray tube is not dense enough to excite the indicating surface of the cathode ray tube to brilliance except when a presentation of a remote object is received. Thus the presentation of remote objects in this type of indication takes the form of bright spots on the cathode ray tube screen. It has been found advantageous in certain applications of such indicating apparatus to have a sweep voltage of such a nature that the bright spot or indication on the screen remains motionless with respect to the screen although the distance to the remote object is changing. Such a system is more fully described in the application of Britton Chance et al., Serial No. 586,420, filed on even date herewith and entitled, "Communications Method" and now abandoned.

In order to provide such an indication as mentioned above, it is necessary to have a sweep voltage which has a time rate of change or rise inversely proportional to the distance of the remote object from the apparatus or to a time interval which is directly proportional to this distance. Accordingly, it is one of the objects of my invention to provide a circuit wherein this is accomplished.

Furthermore, because of the limitations imposed by circuit constants, a point is reached beyond which the rate of rise of the sweep voltage cannot be increased with a practical circuit. As explained in the aforementioned application by Britton Chance et al., it is advantageous to have a circuit which will at the above-mentioned point start producing a compensating voltage directly proportional to the input voltage so that a means of compensation such as is explained in the aforementioned application can be used. Accordingly, it is another of the objects of my invention to provide a circuit wherein such a compensating voltage is produced.

Another way of expressing the requirement of a circuit to give the type of sweep voltage mentioned above is to state that the sweep voltage wave must reach a certain constant voltage at that particular instant following the start of each sweep cycle that corresponds to the distance to the remote object. Therefore, the same magnitude of deflecting voltage will be presented to the cathode ray tube electron beam at the particular instant in each cycle that the indication of the remote object occurs. Thus the general operation embodied in my invention is such that the output voltage wave is "sampled" at a particular instant by the use of a differential amplifier and sampling circuit, and if the sampled voltage is too low or too high, a cathode follower and amplifier circuit respectively increase or decrease the output voltage to the proper value.

My invention will best be understood by reference to the appended drawing in which is shown a specific circuit embodying the principles of my invention.

The circuit herein disclosed embodies a number of triode vacuum tubes containing anode, cathode, and control electrodes, and these tubes are designated as follows: tubes 10 and 20, in a differential amplifier circuit; tubes 30 and 40, in a sampling circuit; tube 50, in a cathode follower circuit; and tube 70, in a sweep generating circuit. Tube 60, a pentode vacuum tube containing anode, suppressor, screen, control, and cathode electrodes, is in an amplifier circuit.

The plate of tube 10 is connected to a source of positive D.-C. plate voltage 11. The cathode of tube 10 is connected through a cathode resistor 12 to a source of negative D.-C. voltage 13.

Tube 20 is connected through resistor 21 to the source of plate voltage 11, and its cathode is connected to the cathode of tube 10. The grid of tube 20 is connected to a voltage divider 24 through a variable contact 22. The voltage divider designated as 24 is connected from the source of plate voltage 11 to ground. The grid of tube 20 is bypassed to ground by capacitor 23. The plate of tube 20 is directly connected to the plate of tube 30 and the cathode of tube 40.

The cathode of tube 30 and the plate of tube 40 are connected together and then to ground through capacitor 37. A sweep rate pulse generator 38 is connected to the primary 31 of a pulse transformer, the other end of which is connected to ground. This pulse transformer has two secondary windings one is 32 and the other is 33. The pulse transformer is designed to pass pulses with a minimum amount of distortion. The grid of tube 30 is connected through capacitor 35 to one end of the secondary winding 33 and the other end of this winding is connected to the cathode of tube 30. A grid leak resistor 36 is connected from the grid of tube 30 to its cathode.

The grid of tube 40 is connected through a capacitor 41 to the secondary winding 32, the other end of this winding being connected to the cathode of tube 40. A grid leak resistor 42 is connected between the grid and cathode of tube 40.

The plate of tube 50 is directly connected to the source of plate voltage 11. The grid of tube 50 is connected to the common terminal between the cathode of tube 30 and the plate of tube 40. The cathode of tube 50 is connected to the source 13 through a cathode resistor 51.

The plate of tube 60 is connected to source 11 through plate load resistor 61, and its cathode is connected directly to ground. The suppressor grid is connected directly to its cathode, and the screen grid is connected directly to the cathode of tube 50. The control grid is connected through a variable contact arm 62 to the cathode resistor 51 of tube 50 and this control grid is also bypassed to ground by capacitor 63.

The plate of tube 70 is connected through resistor 71 to the plate of tube 60. The grid of tube 70 is connected directly to a sweep control pulse generator 75, and the cathode is connected directly to ground. A sweep charging capacitor 73 is connected between plate and cathode of tube 70. The plate of tube 70 is also connected to output terminal 74 and directly connected to the grid of tube 10 to provide a path for the sampling voltage to the differential amplifier.

It is necessary to the operation of this circuit to provide at terminal 72 a negative rectangular voltage wave of a time duration that is desired for the output voltage wave for each cycle. In the specific application previously stated for this circuit, the rectangular voltage wave or gate is obtained from the associated radiant energy system. This source of rectangular voltage waves is represented in the drawing by the sweep voltage control generator 75. It is also necessary to provide a pulse at terminal 34 at the time that it is desired to sample the output voltage. In the specific application stated above, this pulse is also obtained from the associated radiant energy system, and it occurs after a period of time measured from the start of the gate at terminal 72 that is proportional to the distance to the remote object. This source of pulses is represented by the sweep rate pulse generator 38.

The operation of the circuit is initiated by the negative voltage gate at terminal 72 which cuts off tube 70 and allows capacitor 73 to charge through resistor 71 towards the potential appearing at the plate of tube 60. When tube 70 becomes conductive at the termination of the negative gate on its grid, capacitor 73 discharges through tube 70, thus terminating the output sweep voltage wave which appears at terminal 74.

This output wave is applied to the differential amplifier through the grid of tube 10. As the voltage increases on the grid of tube 10, the tube conducts more heavily, and the voltage drop across resistor 12 increases. Since the grid of tube 20 is at a constant potential determined by the setting of 22 on voltage divider 24 to provide the desired amount of amplification, when the voltage across resistor 12 increases, tube 21 will conduct less heavily, and the voltage at its plate will rise in an amplified but similar fashion to the output sweep wave. Thus the differential amplifier acts as a high input impedance, variable gain amplifier.

The sampling circuit, in effect, acts as a clamper circuit which fixes the potential across capacitor 37 at the voltage that appears on the plate of tube 20 at the particular instant that the pulse is received from sweep rate generator 38 on terminal 34, and it keeps the potential across capacitor 37 at this level for the duration of the cycle. When the pulse appears on the pulse transformer windings 32 and 33, the grids of tubes 30 and 40 become positive with respect to their cathodes so that these tubes act as low resistances. Thus capacitor 37 can charge or discharge to the potential at the plate of tube 20, depending upon whether the potential of the previous cycle was higher or lower. When the pulse applied at 34 terminates, the capacitors 35 and 41 discharge through the grid resistors 36 and 42 again cutting off tubes 30 and 40 so that capacitor 37 can maintain its potential for the duration of the cycle.

The potential across capacitor 37 is applied directly to the grid of tube 50 in the cathode follower stage. The output of the cathode follower is directly coupled to the control grid of amplifier tube 60 which has its screen grid also connected to the cathode follower output for increased amplification. The conduction of tube 60, and therefore the potential of its plate, is controlled by the voltage across resistor 51 of the cathode follower. The potential at the plate of tube 60 is the charging potential to which capacitor 73 charges, so therefore the rate of rise of the output sweep voltage depends on the potential at the plate of tube 60.

As a brief explanation of the action of the circuit, consider the case where the pulse received from sweep rate pulse generator 38 occurs at an earlier time than in the previous cycle which corresponds to a decreased distance to the remote object in the case of the circuit application previously stated. When the pulse enters the sampling circuit, the voltage sampled will be less than that remaining across capacitor 37 from the previous cycle, and therefore the voltage will decrease across capacitor 37. The output of the cathode follower stage will decrease also, so that tube 60 will conduct less, and the voltage at its plate will increase. Therefore, due to the increased charging potential, the rate of rise of the sweep voltage will increase; or, it may be stated that the sweep speed has increased as the distance to the remote object decreased.

It will be seen that circuit constants limit the increase in the rate of rise of the output voltage to the point where the voltage across capacitor 37 drops the cathode follower below cutoff. From this point on, the sweep speed will not increase, but the voltage across capacitor 37, which changed only slightly up to this point, will start to change in direct proportion to the change of distance to the remote object which corresponds to the change in the time position in the cycle of the pulse at 34. This circuit feature has an application as a compensating voltage as disclosed in the copending application previously referred to in this specification.

The output waveform of the specific circuit shown for illustrative purposes in this specification is essentially a linear sawtooth or serrated waveform since the linear portion of the exponential charging curve of a sweep charging condenser is used. However, my invention is not limited to use with such a linear sweep generating circuit, but it may be used with more complicated types of sweep circuits, an example of which is the hyperbolic sweep circuit used to present ground distance rather than straight line distance in cases where the radiant energy system is airborne and the remote object is on the ground. Such a hyperbolic sweep generating circuit is disclosed in an application by Jack H. Irving, Serial No. 570,412, filed December 29, 1944, Patent No. 2,611,126 granted September 16, 1952.

It will be apparent to those skilled in the art that changes and adaptations can be made in the specific circuit herein disclosed without departing from the spirit and scope of my invention, and I claim all such modifications as fall fairly within the spirit and scope of the hereinafter appended claims.

What is claimed is:

1. In sweep voltage developing apparatus, energy storage means, differential amplifier means, means for impressing a portion of the energy stored in the said storage means upon the differential amplifier means, clamping circuit means including a plurality of thermionic tubes, means for impressing signals developed by the differential amplifier upon the clamping circuit, means for impressing an electrical pulse upon the clamping circuit whereby said clamping circuit is responsive for the duration of said pulse to the said electrical signals impressed thereon by the differential amplifier, cathode follower means, means for impressing signals developed by the clamping circuit upon the cathode follower means, amplifier means responsive to the output of the said cathode follower means, and means for utilizing energy from said amplifier means to control the rate of storage of energy of said energy storage means.

2. Apparatus in accordance with claim 1 wherein the rate of rise of the value of energy stored in said energy storage means varies inversely with the magnitude of the time increment occurring between the start of the development of the sweep waveform and the impression of the said electrical pulse upon the clamping circuit.

3. Apparatus in accordance with claim 1 wherein the rate of rise of the value of energy stored in said energy storage means varies inversely with the magnitude of the time increment occurring between the start of the development of the sweep waveform and the impression of the said electrical pulse upon the clamping circuit, and wherein the energy storage means comprises a sweep charging capacitor, a thermionic discharge means for discharging at least a portion of the energy stored in said storage means, and means for impressing a control voltage on said thermionic discharge means to determine the time duration of the formed sweep wave.

4. In a radar display system, a generator for producing a sweep potential which varies linearly with time during predetermined time intervals recurrent at the radar pulse repetition rate, comprising: means for activating said generator during each said recurrent interval; selected echo pulse signals returned from a chosen target; differential amplifier means; means for introducing to said differential amplifier means a portion of energy from said generator; means responsive to the output of said amplifier and said selected echo pulse signals for producing a control potential, said means responsive including reversely-connected-in-parallel electron tube means; and connecting means between said means responsive and said generator whereby said control potential is utilized for varying the slope of said sweep potential.

References Cited in the file of this patent

UNITED STATES PATENTS

| | | |
|---|---|---|
| 2,125,732 | Bowman-Manifold et al. | Aug. 2, 1938 |
| 2,126,243 | Busse et al. | Aug. 9, 1938 |
| 2,153,217 | Van Der Mark | Apr. 4, 1939 |
| 2,237,425 | Geiger et al. | Apr. 8, 1941 |
| 2,254,031 | Faudell | Aug. 26, 1941 |
| 2,422,069 | Bedford | June 10, 1947 |
| 2,448,070 | Sunstein | Aug. 31, 1948 |
| 2,463,685 | Fredendall | Mar. 8, 1948 |
| 2,496,543 | Kanner | Feb. 7, 1950 |